US009917783B2

(12) United States Patent
Baldi et al.

(10) Patent No.: US 9,917,783 B2
(45) Date of Patent: *Mar. 13, 2018

(54) METHOD, SYSTEM AND NON-TRANSITORY COMPUTER READABLE MEDIUM FOR PROFILING NETWORK TRAFFIC OF A NETWORK

(71) Applicant: Narus, Inc., Sunnyvale, CA (US)

(72) Inventors: Mario Baldi, Cuneo (IT); Yi-Chao Chen, Austin, TX (US); Yong Liao, Sunnyvale, CA (US); Lili Qiu, Austin, TX (US); Sung-Ju Lee, Redwood City, CA (US)

(73) Assignee: Narus, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,057

(22) Filed: Jan. 9, 2017

(65) Prior Publication Data

US 2017/0118129 A1  Apr. 27, 2017

Related U.S. Application Data

(63) Continuation of application No. 14/144,946, filed on Dec. 31, 2013, now Pat. No. 9,577,898.

(51) Int. Cl.
*H04L 12/26* (2006.01)
*H04L 12/851* (2013.01)
(Continued)

(52) U.S. Cl.
CPC ........ *H04L 47/2483* (2013.01); *H04L 43/106* (2013.01); *H04L 47/28* (2013.01); *H04L 61/2571* (2013.01); *H04L 47/2416* (2013.01)

(58) Field of Classification Search
CPC ... H04L 43/106; H04L 47/2416; H04L 47/28; H04L 47/2483; H04L 61/2571
(Continued)

(56) References Cited

U.S. PATENT DOCUMENTS 8,743,683 B1  6/2014  Hughes
8,964,548 B1  2/2015  Keralapura et al.
(Continued)

OTHER PUBLICATIONS

"U.S. Appl. No. 14/144,946, Advisory Action dated Mar. 29, 2016", 3 pages.
(Continued)

*Primary Examiner* — Omar Ghowrwal
*Assistant Examiner* — Kokou R Detse
(74) *Attorney, Agent, or Firm* — Kwan & Olynick LLP

(57) ABSTRACT

A method for profiling network traffic of a network. The method includes capturing packets based at least on a common source IP address shared by each of the packets, where said each packet is assigned a source timestamp by a source of said each packet and further assigned a capture timestamp by a packet capturing device, identifying a first portion of the packets as a first flow and a second portion of the packets as a second flow, extracting a first monotonic timestamp-pair (MTSP) sequence and a second MTSP sequence from the first flow and the second flow, respectively, comparing the first MTSP sequence and the second MTSP sequence to generate a result, and determining, based on the result, whether the first flow and the second flow are generated by a single host of the network.

20 Claims, 9 Drawing Sheets

(51) Int. Cl.
*H04L 12/841* (2013.01)
*H04L 29/12* (2006.01)
*H04L 12/853* (2013.01)

(58) Field of Classification Search
USPC .......................................................... 370/252
See application file for complete search history.

(56) References Cited

U.S. PATENT DOCUMENTS

| 9,577,898 | B1* | 2/2017 | Baldi | ................... H04L 43/062 370/252 |
|---|---|---|---|---|
| 2004/0016000 | A1 | 1/2004 | Zhang et al. | |
| 2007/0064699 | A1 | 3/2007 | Bernick et al. | |
| 2011/0276730 | A1 | 11/2011 | Lin et al. | |
| 2013/0322255 | A1 | 12/2013 | Dillon | |

OTHER PUBLICATIONS

"U.S. Appl. No. 14/144,946, Final Office Action dated Jan. 11, 2016", 18 pages.
"U.S. Appl. No. 14/144,946, Non Final Office Action dated May 10, 2016", 18 pages.
"U.S. Appl. No. 14/144,946, Non Final Office Action dated Jul. 17, 2015", 17 pages.
"U.S. Appl. No. 14/144,946, Notice of Allowance dated Oct. 7, 2016", 5 pages.
Tekeoglu. Ali. et al., "Approximating the Number of Active Nodes Behind a NAT Device", Computer Communications and Networks (ICCCN), 2011 Proceedings of the 20th International Conference, Jul. 31-Aug. 4, 2011, pp. 1-7.
Kohno, Tadayoshi, et al., "Remote Physical Device Fingerprinting", IEEE Transactions on Dependable and Secure Computing, vol. 2, No. 2, Apr.-Jun. 2005, pp. 93-108.
Baldwin, Steven, "A Technique for Counting NA Ted Hosts", IMW '02, Nov. 6-8, 2002, pp. 267-272.
Bi, Jun, et al., "Application Presence Information Based Source Address Transition Detection for Edge Network Security and Management", IJCSNS, vol. 7, No. 1, Jan. 2007, pp. 147-152.
Schulz, Steffen, et al., "Tetherway: A Framework for Tethering Camouflage", WiSec '12, Apr. 16-18, 2012.
Bursztein, Elie, "Time has something to tell us about Network Address Translation", Jul. 2007.
ForeScout Technologies, Inc., ForeScout CounterACT, "Network Address Translation (NAT) Detection" Technology Brief, 2011.
Straka, K., et al., "Passive Detection of NAT Routers and Client Counting", 2006 in International Federation for 8 Information Processing, vol. 222, Advances in Digital Forensics 11, eds, Oliver, M., Shenoi, S., (Boston: Springer), pp. 239-246.

\* cited by examiner

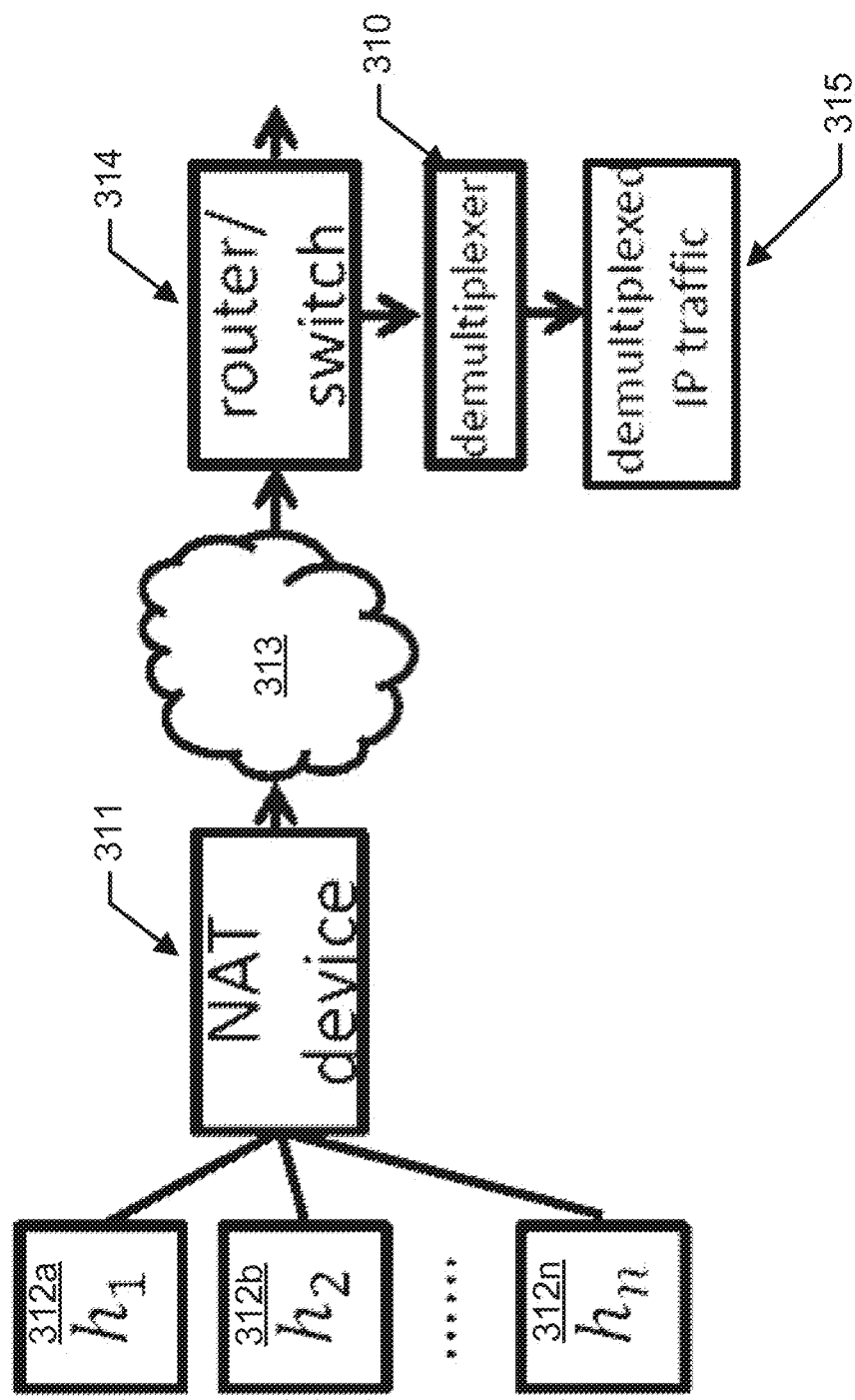
FIG. 3.1

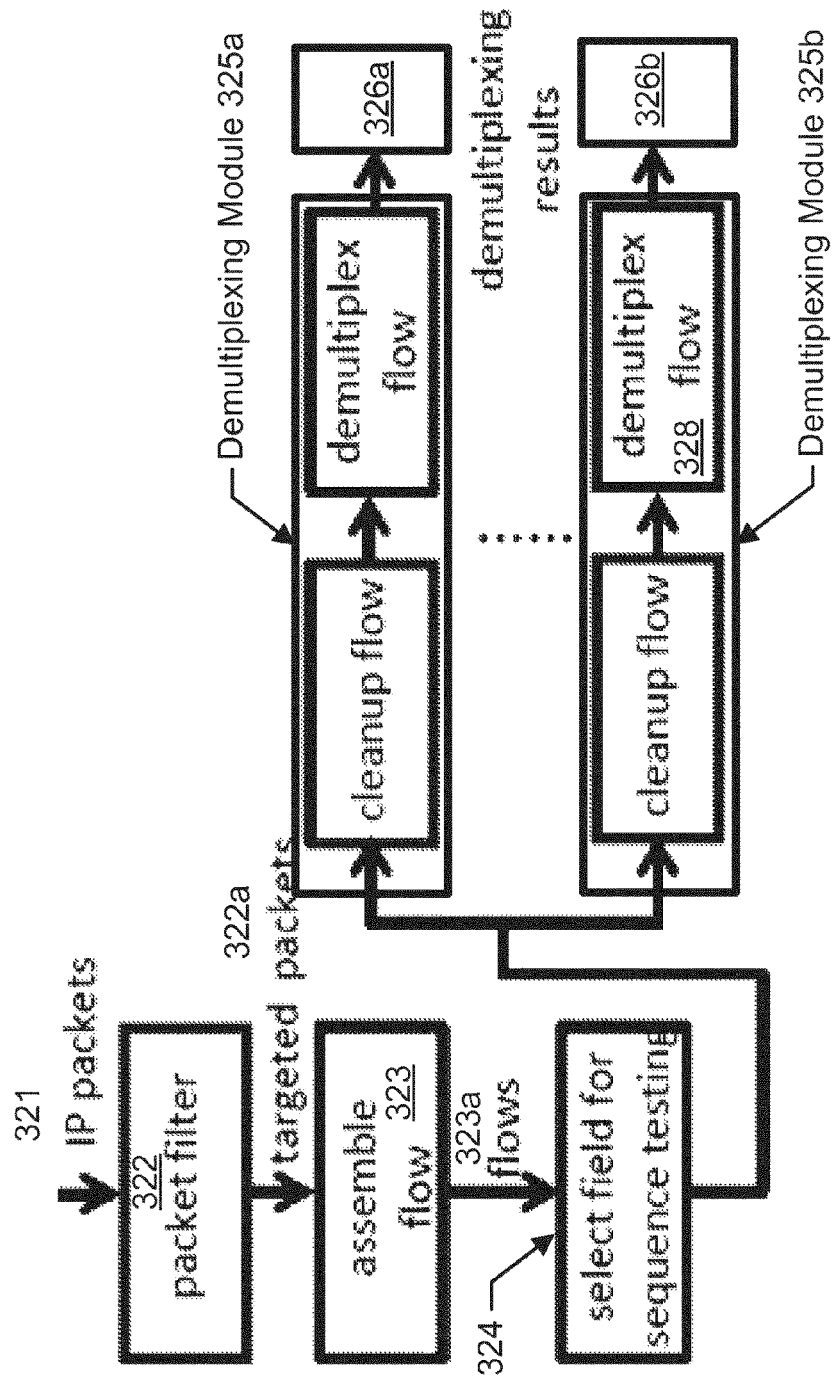
FIG. 3.2

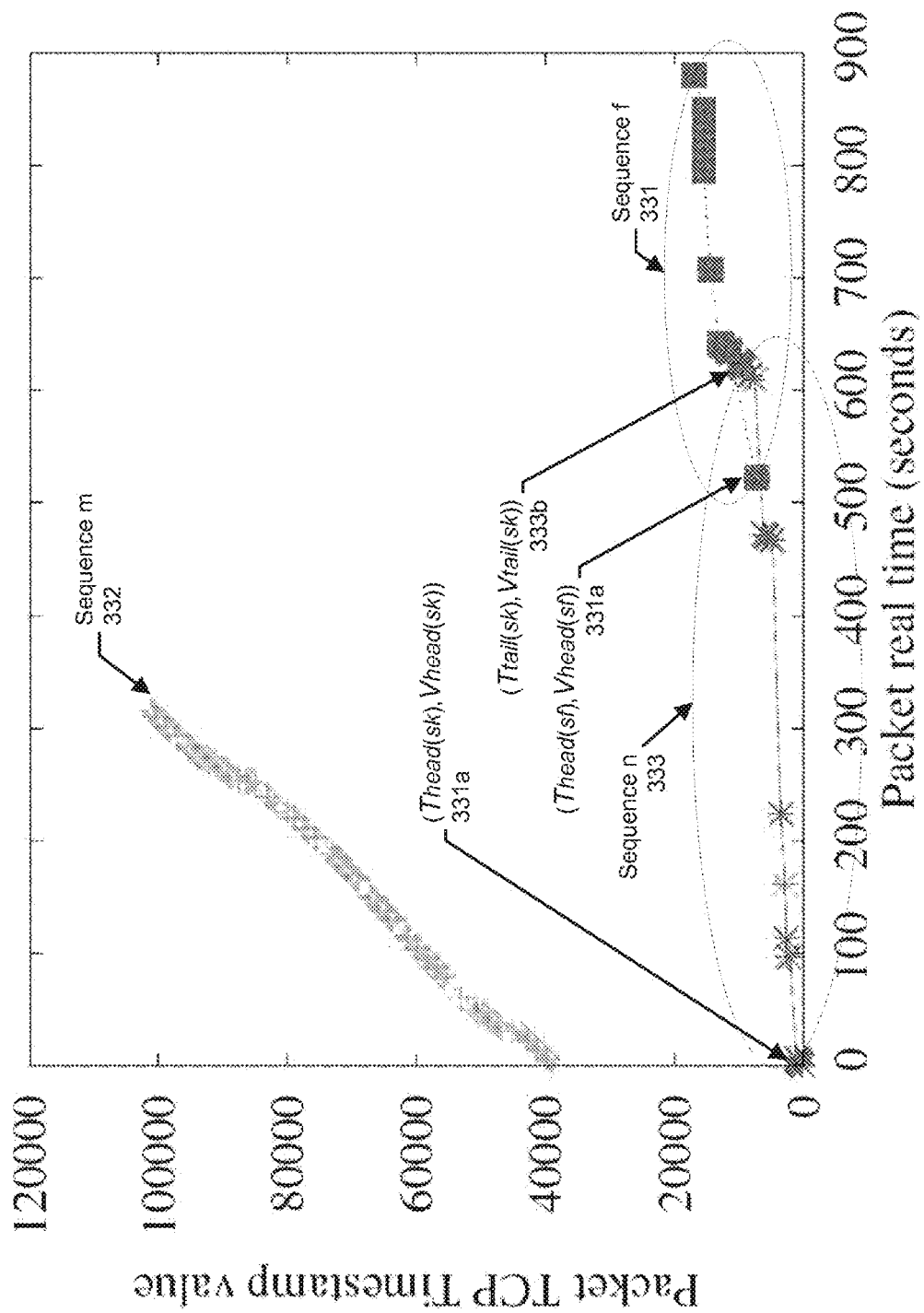
FIG. 3.3

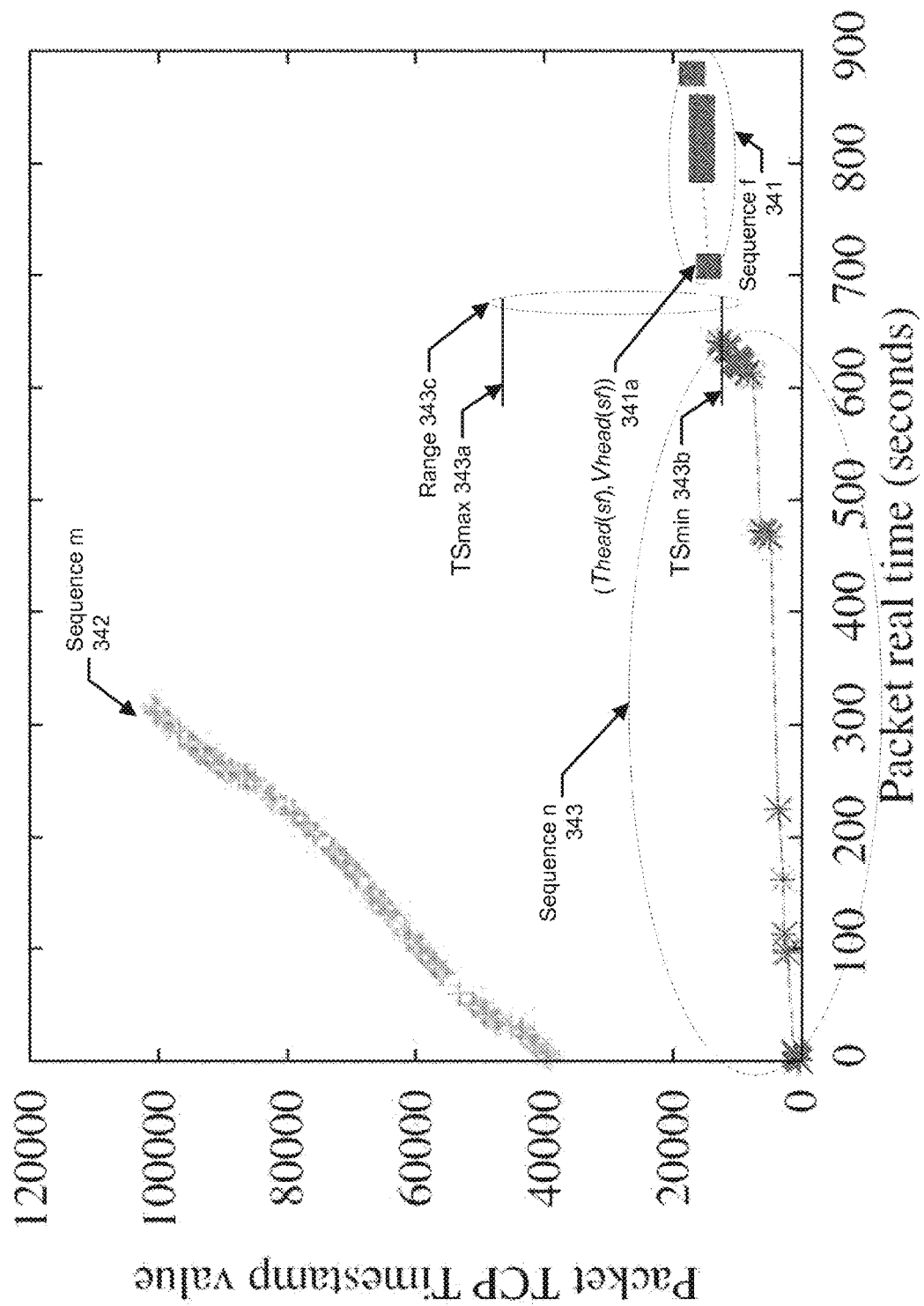
FIG. 3.4

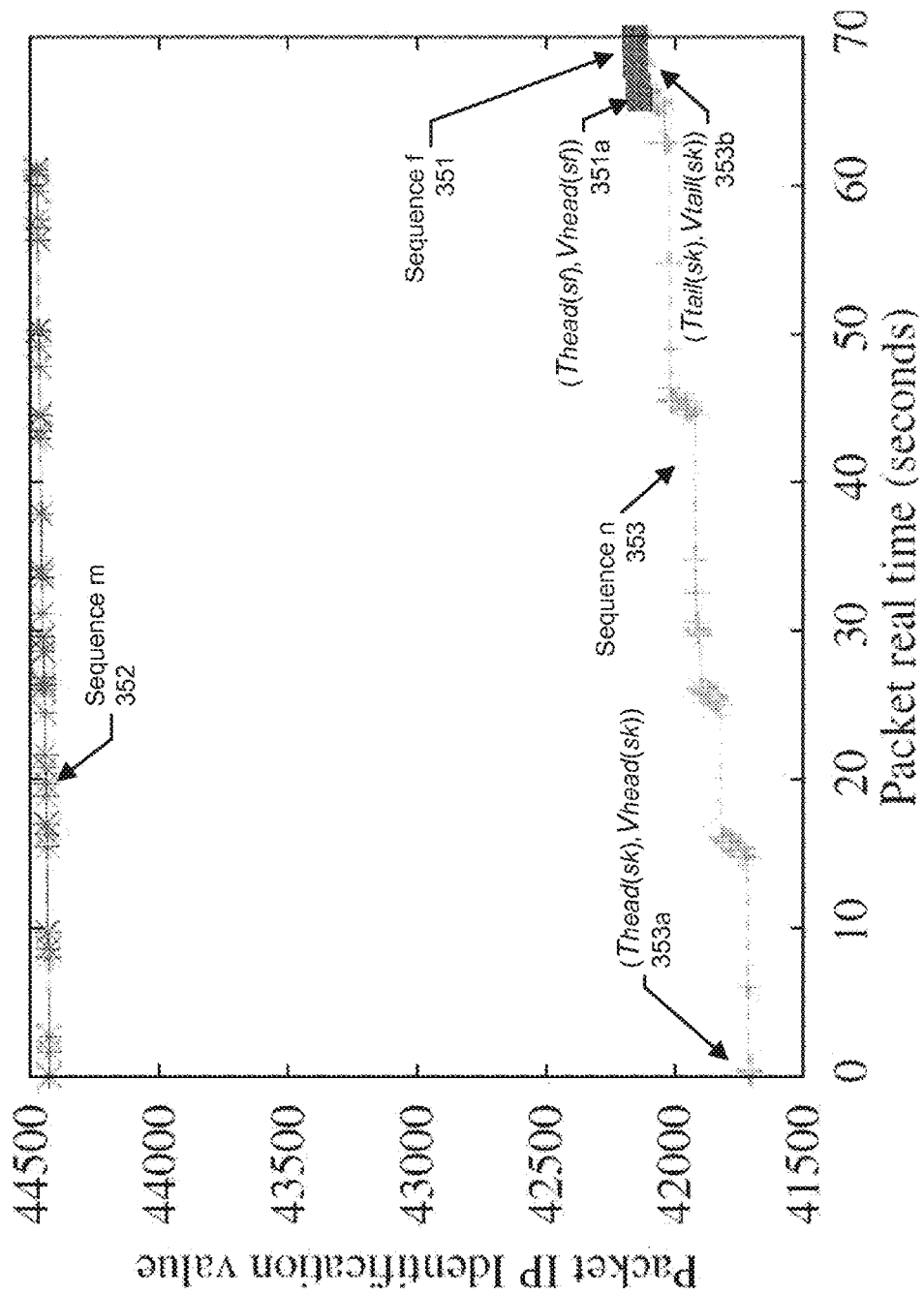
FIG. 3.5

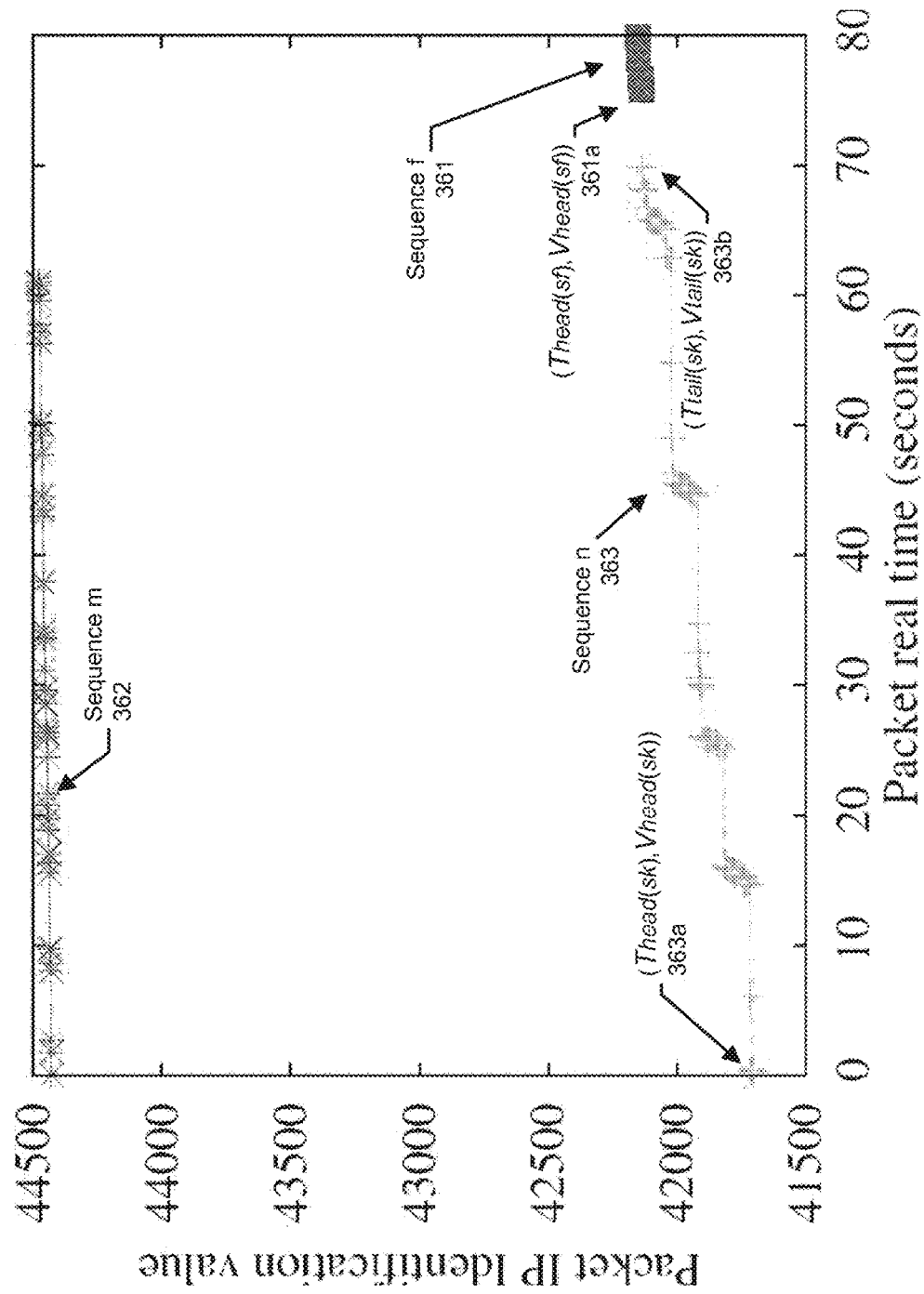
FIG. 3.6

METHOD, SYSTEM AND NON-TRANSITORY COMPUTER READABLE MEDIUM FOR PROFILING NETWORK TRAFFIC OF A NETWORK

CROSS-REFERENCE TO RELATED APPLICATIONS

This application is a continuation of and claims benefit of priority under 35 U.S.C. § 120 to U.S. application Ser. No. 14/144,946, entitled "Identifying IP Traffic from Multiple Hosts Behind a Network Address Translation Device," filed on Dec. 31, 2013, which is incorporated herein by reference in its entirety.

BACKGROUND OF THE INVENTION

Network Address Translation (NAT) is the process of modifying IP address information in network traffic (e.g., IPv4 traffic) headers while in transit across a traffic routing device. NAT became a popular tool for alleviating the consequences of IPv4 address exhaustion. It has become a common feature in routers for home and small-office Internet connections.

SUMMARY

In general, in one aspect, the present invention relates to a method for profiling network traffic of a network. The method includes capturing, from the network traffic using a packet capturing device, a plurality of packets, identifying a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device, extracting, by a processor of a computer system and from the first flow, a first monotonic timestamp-pair (MTSP) sequence, wherein the first MTSP sequence comprises a first plurality of source-timestamp-and-capture-timestamp-pairs based on the source timestamp and the capture timestamp assigned to said each packet in the first portion of the plurality of packets, extracting, by the processor and from the second flow, a second MTSP sequence, wherein the second MTSP sequence comprises a second plurality of source-timestamp-and-capture-timestamp-pairs based on the source timestamp and the capture timestamp assigned to said each packet in the second portion of the plurality of packets, comparing, by the processor and based on a pre-determined criterion, the first MTSP sequence and the second MTSP sequence to generate a result, and determining, based on the result, whether the first flow and the second flow are generated by a single host of the network.

In general, in one aspect, the present invention relates to a system for profiling network traffic of a network. The system includes (i) a packet capturing device configured to capture, from the network traffic, a plurality of packets, (ii) memory comprising instructions executable by the processor, wherein the instructions comprises (a) an acquisition module configured to identify a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device, (b) a monotonic sequence generator configured to extract, from the first flow, a first monotonic timestamp-pair (MTSP) sequence, wherein the first MTSP sequence comprises a first plurality of source-timestamp-and-capture-timestamp-pairs based on the source timestamp and the capture timestamp assigned to said each packet in the first portion of the plurality of packets, and extract, from the second flow, a second MTSP sequence, wherein the second MTSP sequence comprises a second plurality of source-timestamp-and-capture-timestamp-pairs based on the source timestamp and the capture timestamp assigned to said each packet in the second portion of the plurality of packets, and (c) a host analyzer configured to compare, based on a pre-determined criterion, the first MTSP sequence and the second MTSP sequence to generate a result, and determine, based on the result, whether the first flow and the second flow are generated by a single host of the network, and (iii) a data repository configured to store the first MTSP sequence, the second MTSP sequence, and the result.

In general, in one aspect, the present invention relates to a computer readable medium storing instructions, when executed by the computer to profile network traffic of a network. The instructions include functionality for capturing, from the network traffic using a packet capturing device, a plurality of packets, identifying a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device, extracting, from the first flow, a first monotonic timestamp-pair (MTSP) sequence, wherein the first MTSP sequence comprises a first plurality of source-timestamp-and-capture-timestamp-pairs based on the source timestamp and the capture timestamp assigned to said each packet in the first portion of the plurality of packets, extracting, from the second flow, a second MTSP sequence, wherein the second MTSP sequence comprises a second plurality of source-timestamp-and-capture-timestamp-pairs based on the source timestamp and the capture timestamp assigned to said each packet in the second portion of the plurality of packets, comparing, based on a pre-determined criterion, the first MTSP sequence and the second MTSP sequence to generate a result, and determining, based on the result, whether the first flow and the second flow are generated by a single host of the network.

In general, in one aspect, the present invention relates to a method for profiling network traffic of a network. The method includes capturing, from the network traffic using a packet capturing device, a plurality of packets, identifying a first portion of the plurality of packets as a first flow and a second portion of the plurality of packets as a second flow, wherein the first flow and the second flow are identified based at least on a common source IP address shared by each packet of the first flow and the second flow, extracting, by a processor of a computer system and from the first flow, a plurality of values each assigned to a pre-determined protocol field in a packet in the first flow, analyzing, by the processor, the plurality of values to determine that the plurality of values are assigned based on a pre-determined algorithm to the pre-determined protocol field by a device generating the first flow, analyzing, by the processor, the second flow to generate a result, wherein the result comprises a determination that the pre-determined algorithm is not used to assign values to the pre-determined protocol field of the second flow in a consistent manner as the first flow, and determining, based on the result, that the first flow and the second flow are generated by different hosts of the network.

Other aspects and advantages of the invention will be apparent from the following description and the appended claims.

BRIEF DESCRIPTION OF DRAWINGS

FIGS. 3.1-3.6 show various examples according to aspects of the invention.

DETAILED DESCRIPTION

Figure 1:
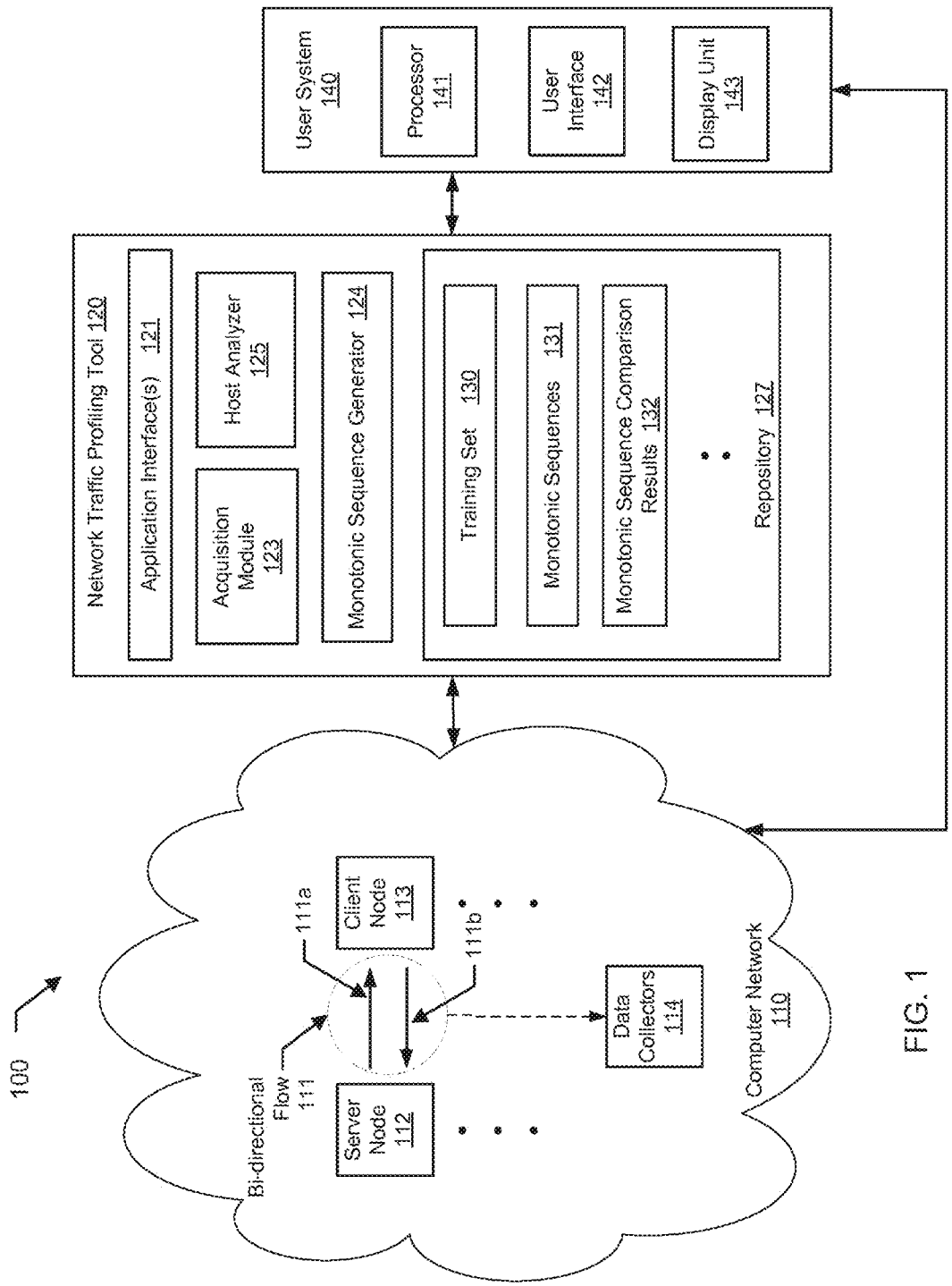
FIG. 1 shows a system block diagram according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

The web (or "World Wide Web") is a system of interlinked hypertext documents (i.e., web pages) accessed via the Internet using URLs (i.e., Universal Resource Locators) and IP-addresses. The Internet is composed of machines (e.g., computers or other devices with Internet access) associated with IP-addresses for identifying and communicating with each other on the Internet. The Internet, URL, and IP-addresses are well known to those skilled in the art. The machines composing the Internet are called endpoints on the Internet. Internet endpoints may act as a server, a client, or a peer in the communication activity on the Internet. The endpoints may also be referred to as hosts (e.g., network hosts or Internet hosts) that host information as well as client and/or server software. Network nodes such as modems, printers, routers, and switches may not be considered as hosts.

Generally, a flow (or traffic stream) between two network hosts is a series of data records (referred to as packets or data packets) regarding the communication between the two network hosts engaged in an Internet transaction. The Internet transaction may be related to completing a task, which may be legitimate or malicious. Each packet includes a block of data (i.e., actual packet content, referred to as payload) and supplemental data (referred to as header) containing information regarding the payload. Each flow is referred to as attached to each of the two hosts and is uniquely defined by a 5-tuple identifier (i.e., source address, destination address, source port, destination port, and transport protocol). Specifically, each packet in a flow includes, in its header, the 5-tuple identifier of the flow. Throughout this disclosure, the terms "traffic flow", "flow", "traffic stream" and "stream" are used interchangeably and may refer to a complete flow or any portion thereof depending on the context unless explicitly stated otherwise.

Further, the term "transport protocol" refers to a protocol associated with or based on top of a transport layer of a computer network. For example, the transport protocol may be referred to as layer-four protocol with respect to the OSI model (i.e., Open Systems Interconnection Reference Model of the network architecture). Examples of layer-four protocols include TCP (i.e., transmission control protocol), UDP (i.e., user datagram protocol), etc.

Further still, the term "application" or "network application" refers to an application associated with or based on top of an application layer of a computer network while the term "signature" or "packet content signature" refers to an application layer packet content based signature. For example, the network application may be referred to as layer-seven application with respect to the OSI model. Examples of layer-seven applications includes HTTP (HyperText Transfer Protocol), SMTP (Simple Mail Transfer Protocol), IRC (Internet relay chat), FTP (File Transfer Protocol), BitTorrent®, GTALK® (a registered trademark of Google, Inc., Mountain View, Calif.), MSN® (a registered trademark of Microsoft Corporation, Redmond, Wash., etc.). Layer-seven applications may also be referred to as layer-seven protocols.

Packet capture is the act of capturing data packets crossing a network. Partial packet capture may be performed to record headers without recording the total content of corresponding payloads. Deep packet capture may be performed to capture complete network packets including packet header and complete packet payload. Once packets in a flow, or a portion thereof, are captured and stored, deep packet inspection may be performed to review network packet data, perform forensics analysis to uncover the root cause of network problems, identify security threats, and ensure data communications and network usage complies with outlined policy. Throughout this disclosure, a complete network packet including packet header and complete packet payload may be referred to as a full payload packet while the complete packet payload may be referred to as a full packet payload. The term "payload" may refer to full packet payload, partial packet payload, a collection of full/partial packet payloads within a flow or a portion thereof, in an interchangeable manner depending on the context unless explicitly stated otherwise.

FIG. 1 shows a system block diagram of a system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the system (100) includes a network traffic profiling tool (120), a user system (140), and a computer network (110). The network traffic profiling tool (120) includes data repository (127), one or more application interfaces (121), acquisition module (123), monotonic sequence generator (124), and host analyzer (125). The user system (140) includes a processor (141), a user interface (142), and a display unit (143). The computer network (110) may include wired and/or wireless portions of the Internet and/or other data communications networks such as wide area networks (WANs), local area networks (LANs), etc. Further, the computer network (110) includes network nodes (e.g., server node (112), client node (113), data collectors (114), etc.), which are devices configured with computing and communication capabilities for executing applications in the network (110).

As shown in FIG. 1, the server node (112) and client node (113) communicate with each other by exchanging data packets forming a bi-directional flow (111), which includes two uni-directional flows (111a) and (111b) represented by two arrows. In one or more embodiments, the server node (112) and the client node (113) exchange data packets in the bi-directional flow (111) as a result of an application executing on the server node (112) and the client node (113). In this context, the bi-directional flow (111) is referred to as being generated by the application executing on the server node (112) and client node (113). For example, the source IP address in the 5-tuple of the uni-directional flow (111a) and the destination IP address in the 5-tuple of the unit-direction flow (111b) are both the IP address of the server node (112), referred to as the server IP address. The destination IP address in the 5-tuple of the uni-directional flow (111a) and the source IP address in the 5-tuple of the unit-direction flow (111b) are both the IP address of the client node (113), referred to as the client IP address. The source port in the 5-tuple of the uni-directional flow (111a) and the destination port in the 5-tuple of the unit-direction flow (111b) are both the port of the server node (112), referred to as the server port. The destination port in the 5-tuple of the uni-directional flow (111a) and the port in the 5-tuple of the unit-direction flow (111b) are both the port of the client node (113), referred to as the client port. Further, the server port and the transport protocol in both 5-tuples are characteristics of the application executing on the server node (112) and the client node (113).

In one or more embodiments, certain device(s) (e.g., data collectors (114)) within the computer network (110) may be configured to collect network data (e.g., bi-directional flow (111)) for providing to the network traffic profiling tool (120). In one or more embodiments, the data collectors (114) are referred to as packet capturing devices. Each of these components is described below. One of ordinary skill in the art will appreciate that embodiments are not limited to the configuration shown in FIG. 1.

In one or more embodiments of the invention, the network traffic profiling tool (120) is configured to interact with the computer network (110) using one or more of the application interface(s) (121). The application interface(s) (121) may be configured to receive data (e.g., bi-directional flow (111)) from the computer network (110) and/or store received data to the data repository (127). Such network data captured over a time period (e.g., an hour, a day, a week, etc.) is referred to as trace or network trace. Network trace contains network traffic data related to communications between nodes in the computer network (110). For example, the network trace may be captured on a routine basis using the data collectors (114) and selectively sent to the application interface(s) (121) from time to time to be formatted and stored in the repository (127) for analysis. For example, the data collectors (114) may be a packet analyzer, network analyze, protocol analyzer, sniffer, netflow device, semantic traffic analyzer (STA), or other types of data collection device that intercept and log data traffic passing over the computer network (110) or a portion thereof. In one or more embodiments, the data collectors (114) may be deployed in the computer network (110) by a network communication service provider (e.g., ISP), a network security service provider, or other business or government entities. The data collector (114) may be configured to capture and provide network trace to the application interface(s) (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic profiling tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic profiling tool (120). The user may include, but is not limited to, an individual, a group, an organization, or some other entity having authority and/or responsibility to access the network traffic profiling tool (120). Specifically, the context of the term "user" here is distinct from that of a user of the computer network (110). The user system (140) may be, or may contain a form of, an internet-based communication device that is capable of communicating with the application interface(s) (121) of the network traffic profiling tool (120). Alternatively, the network traffic profiling tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic profiling tool (120) (e.g., report, alert, etc.).

As shown, communication links are provided between the network traffic profiling tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired and wireless. In one or more embodiments, the network traffic profiling tool (120), the user system (140), and the communication links may be part of the computer network (110).

In one or more embodiments, a central processing unit (CPU, not shown) of the network traffic profiling tool (120) is configured to execute instructions to operate the components of the network traffic profiling tool (120). In one or more embodiments, the memory (not shown) of the network traffic profiling tool (120) is configured to store software instructions for analyzing the network trace to extract features (e.g., cells, cell groups, signature terms, etc.), generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic profiling tool (120) may include one or more system computers, which may be implemented as a server or any conventional computing system having a hardware processor. However, those skilled in the art will appreciate that implementations of various technologies described herein may be practiced in other computer system configurations, including hypertext transfer protocol (HTTP) servers, multiprocessor systems, microprocessor-based or programmable consumer electronics, hand-held devices, network personal computers, minicomputers, mainframe computers, and the like.

In one or more embodiments, the network traffic profiling tool (120) is configured to obtain and store data in the data repository (127). In one or more embodiments, the data repository (127) is a persistent storage device (or set of devices) and is configured to receive data from the computer network (110) using the application interface(s) (121). The data repository (127) is also configured to deliver working data to, and receive working data from, the acquisition module (123), monotonic sequence generator (124), and host analyzer (125). The data repository (127) may be a data store (e.g., a database, a file system, one or more data structures configured in a memory, some other medium for storing data, or any suitable combination thereof), which may include information (e.g., flows (130), monotonic sequences (131), etc.) related to the network traffic profiling. The data repository (127) may be a device internal to the network traffic profiling tool (120). Alternatively, the data repository (127) may be an external storage device operatively connected to the network traffic profiling tool (120).

In one or more embodiments, the network traffic profiling tool (120) is configured to interact with the user system (140) using the application interface(s) (121). The application interface(s) (121) may be configured to receive data and/or instruction(s) from the user system (140). The application interface(s) (121) may also be configured to deliver information and/or instruction(s) to the user system (140). In one or more embodiments, the network traffic profiling tool (120) is configured to support various data formats provided by the user system (140).

In one or more embodiments, the network traffic profiling tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) to form the network trace. For example, such network trace, or information extracted therefrom, may then be stored in the repository (127) as flows (130), etc.

In one or more embodiments, a flow parser (e.g., acquisition module (123) in conjunction with data collectors (114) in FIG. 1) reconstructs (e.g., eliminates redundant packets, collates packets into correct order, etc.) all the packets that correspond to the same traffic flow (e.g., uni-directional flows (111a), (111b)) identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments, the network traffic profiling tool (120) includes the monotonic sequence generator (124) that is configured to extract monotonic sequences (131) from the flows (130). In one or more embodiments, each monotonic sequence of the monotonic sequences (131) is extracted from a flow in the flows (130). Specifically, a monotonic sequence is a sequence of value pairs where each value pair includes a capture timestamp and a particular header field value of a packet in the flow. The term "monotonic" refers to the property of the particular header field value that always increases or decreases with respect to the capture timestamp. In one or more embodiments, the particular header field is a timestamp (e.g., TCP timestamp) assigned to the packet by the device (e.g., a host) generating the flow. In one or more embodiments, the particular header field is the IP-Identification field whose value is assigned to the packet by the host generating the flow.

In one or more embodiments, the monotonic sequence generator (124) is configured to determine that a TCP timestamp option is enabled in a particular flow of the flows (130). Accordingly, the monotonic sequence generator (124) extracts a monotonic timestamp-pair (MTSP) sequence from the particular flow. Specifically, the MTSP sequence is a sequence of source-timestamp-and-capture-timestamp-pairs based on the source timestamp (e.g., TCP timestamp) and the capture timestamp assigned to each packet in the particular flow. As noted above, the term "monotonic" refers to the property of the source timestamp that always increases or decreases with respect to the capture timestamp.

In one or more embodiments, the monotonic sequence generator (124) is configured to determine that a TCP timestamp option is disabled in a particular flow of the flows (130). Accordingly, the monotonic sequence generator (124) extracts a monotonic timestamp-ID (MTSID) sequence from the particular flow. Specifically, the MTSID sequence is a sequence of capture-timestamp-and-IP-ID-pairs based on the capture timestamp and the IP-ID assigned to each packet in the particular flow.

In one or more embodiments, the network traffic profiling tool (120) includes the host analyzer (125) that is configured to compare two or more monotonic sequences from the monotonic sequences (131) based on a pre-determined criterion to generate a result (e.g., part of the monotonic sequence comparison results (132)), and to determine, based on the result, whether the corresponding two or more flows are generated by a single host or multiple hosts of the network (110). For example, the two or more monotonic sequences being compared may be MTSP sequences if their TCP timestamp options are enabled in the corresponding flows. In another example, the two or more monotonic sequences being compared may be MTSID sequences if their TCP timestamp options are disabled in the corresponding flows.

Additional details of the functionalities of the monotonic sequence generator (124) and the host analyzer (125) are described in reference to FIG. 2 below.

Examples of using the system (100) described above to identify flows in the network traffic that are generated by separate hosts using the same source IP address are shown in FIGS. 3.1-3.6 below.

Figure 2:
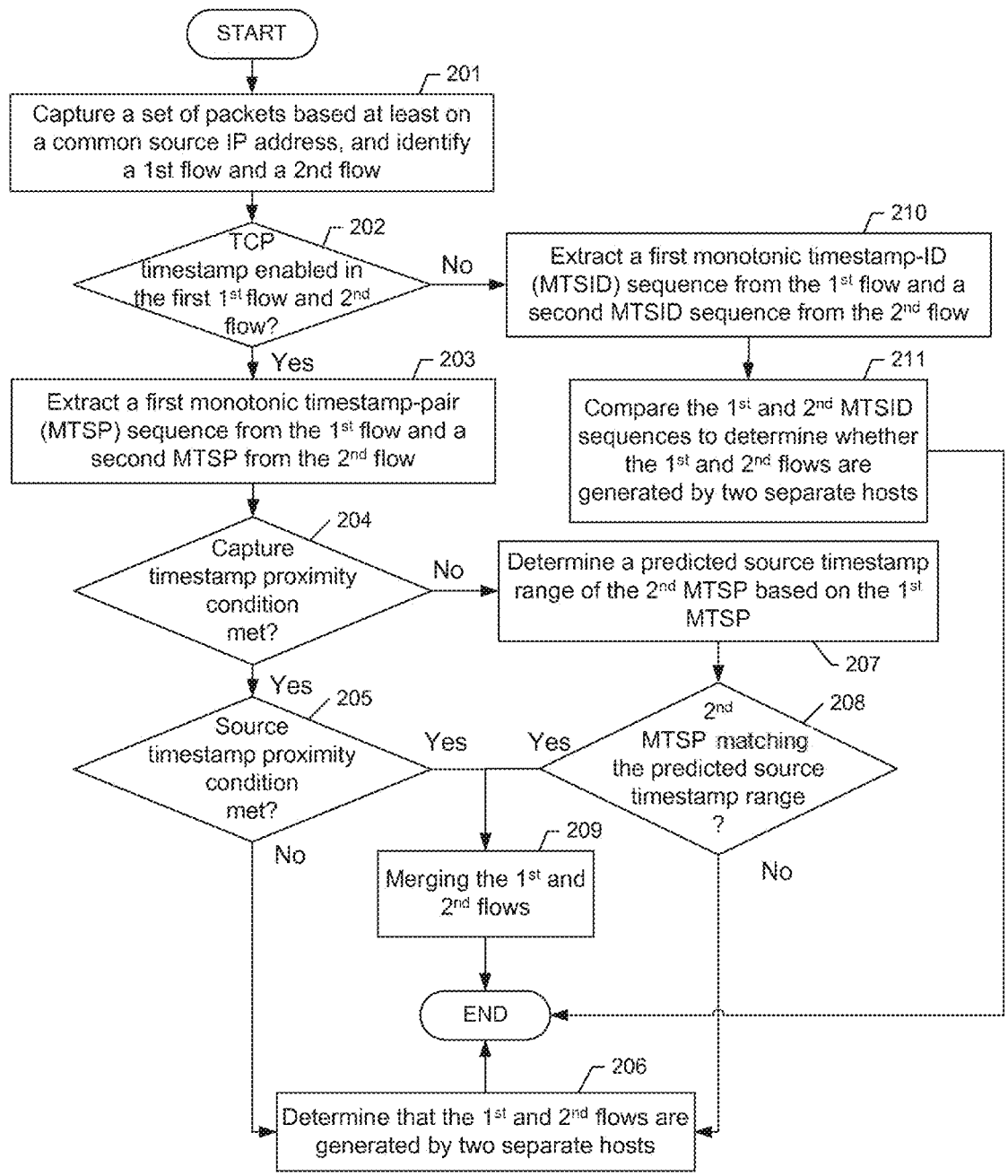
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using system (100) described with respect to FIG. 1 above.

The flowchart shown in FIG. 2 describes a method for profiling network traffic of a network. In particular, the method identifies flows in the network traffic that are generated by separate hosts using the same source IP address. For example, these separate hosts may generate these flows via a network address translation (NAT) device.

Initially in Step 201, a set of packets are captured from the network traffic using a packet capturing device. In one or more embodiments of the invention, each packet is assigned a source timestamp by a device generating each packet and further assigned a capture timestamp by the packet capturing device. For example, the device may be a host in the network. In one or more embodiments, a portion of the set of packets is identified as a first flow, and another portion of the set of packets is identified as a second flow. Specifically, the first flow and the second flow are identified based at least on a common source IP address shared by each packet of the first flow and the second flow. Generally, the flows in the network traffic may be identified based on a five tuple of source IP address, destination IP address, source port, destination port, and protocol. In other words, all packets in the first flow share the same values in the five tuple of the first flow, while all packets in the second flow share the same values in the five tuple of the second flow. Further, the five tuple of the first flow and the five tuple of the second flow are distinct from each other except the aforementioned common source IP address. For example, the five tuple of the first flow and the five tuple of the second flow may share the aforementioned common source IP address but may have different destination IP addresses, source ports, destination ports, and/or protocols. In one or more embodiments, the source timestamp is the TCP timestamp assigned by a host according to the TCP protocol. For example, the TCP timestamp may be a sequential number monotonically increased by a logic clock in the host generating the TCP packets. Generally, the TCP timestamp is an option that may be disabled or enabled according to the TCP protocol. The aforementioned common source IP address may represent the host or a NAT device that translates the IP address of the host.

Step 202, a determination is made regarding whether the TCP timestamp option is enabled in the first flow and the second flow. If the determination is positive, i.e., the TCP timestamp is enabled for both the first flow and the second flow, the method proceeds to Step 203. If the determination is negative, i.e., the TCP timestamp is not enabled for the first flow and the second flow, the method proceeds to Step 210.

In Step 203, a first monotonic timestamp-pair (MTSP) sequence is extracted from the first flow. Specifically, the first MTSP sequence includes source-timestamp-and-capture-timestamp-pairs) based on the source timestamp and the capture timestamp assigned to each packet of the first flow. For example, each element (or point) in the first MTSP sequence is a (source timestamp, capture timestamp) pair of a packet in the first flow. Accordingly, multiple (source timestamp, capture timestamp) pairs of multiple packets in the first flow form the MTSP sequence according to the monotonic values of the (source timestamp, capture timestamp) pairs. Similarly, a second MTSP sequence is extracted from the second flow. Specifically, the second MTSP sequence includes source-timestamp-and-capture-timestamp-pairs based on the source timestamp and the capture timestamp assigned to each packet of the second flow.

In Step 204, a determination is made as to whether a capture timestamp proximity condition is met. The capture timestamp proximity condition refers to a required level of closeness or contiguity of the capture timestamps of the first MTSP and the capture timestamps of the second MTSP. In one or more embodiments, the capture timestamp proximity condition requires the range of capture timestamps of the first MTSP and the range of capture timestamps of the second MTSP overlap each other. If the determination is positive, i.e., the required level of closeness/contiguity of the capture timestamps of the first MTSP and the capture timestamps of the second MTSP are met, the method proceeds to Step 205. If the determination is negative, i.e., the capture timestamp proximity condition is not met, the method proceeds to Step 207. In one or more embodiments, failure to meet the capture timestamp proximity condition is referred to as capture timestamp segregation.

In Step 205, a determination is made as to whether a source timestamp proximity condition is met. The source timestamp proximity condition refers to a required level of closeness or contiguity of the source timestamps of the first MTSP and the source timestamps of the second MTSP. In one or more embodiments, the source timestamp proximity condition requires the range of source timestamps of the first MTSP and the range of source timestamps of the second MTSP overlap each other. If the determination is positive, i.e., the required level of closeness/contiguity of the source timestamps of the first MTSP and the source timestamps of the second MTSP are met, the method proceeds to Step 209 where the first flow and the second flow are merged into a single flow. Accordingly, the first flow and the second flow are considered to be generated by a single host. If the determination is negative, i.e., the source timestamp proximity condition is not met, the method proceeds to Step 206 where the first flow and the second flow are considered to be generated by two separate hosts using the same source IP address. For example, these two separate hosts may generate the first flow and the second flow via the aforementioned NAT device. In one or more embodiments, failure to meet the source timestamp proximity condition is referred to as source timestamp segregation.

In Step 207, when the first flow and the second flow do not meet the capture timestamp proximity condition, a predicted source timestamp range of the later of the two flows (e.g., the second flow) is generated based on the earlier of the two flows (e.g., the first flow). For example, the first flow may terminate prior to any packet of the second flow is captured. The predicted source timestamp range is a prediction of possible values of the source timestamp for any subsequent packet of the first flow that may be captured by the aforementioned packet capturing device separate from capturing earlier packets of the first flow. In other words, not all packets of the first flow are combined and recognized as a single flow by the packet capturing device or any post processing device. In one or more embodiments, the predicted source timestamp range is generated based on the source timestamp of a trailing timestamp pair (e.g., the last point) in the first MTSP sequence, a capture timestamp difference between the trailing timestamp pair in the first MTSP sequence and a leading (e.g., the first point) timestamp pair in the second MTSP sequence, and a predetermined frequency. In one or more embodiments, the pre-determined frequency is a common frequency used by the hosts to generate TCP timestamps for subsequent packets.

In Step 208, a determination is made as to whether the second MTSP matches the predicted source timestamp range. For example, the determination may be regarding whether the source timestamp of a leading (e.g., the first point) timestamp pair in the second MTSP sequence is within the predicted source timestamp range. If the determination is positive, i.e., the second MTSP matches the predicted source timestamp range, the method proceeds to Step 209 where the first flow and the second flow are merged into a single flow, as described above. If the determination is negative, i.e., the second MTSP does not match the predicted source timestamp range, the method proceeds to Step 206 where the first flow and the second flow are considered to be generated by two separate hosts using the same source IP address, as described above.

In summary, the Steps 204, 205, 207, and 208 collectively compare the first MTSP sequence and the second MTSP sequence based on a pre-determined criterion to generate a result. Further, based on the result, the steps 206 and 209 collectively determine whether the first flow and the second flow are generated by a single host of the network. In particular, the pre-determined criterion for the comparison is based on the capture timestamp proximity condition, the source timestamp proximity condition, and the predicted source timestamp range.

Returning to the discussion of Step 202, when the determination made in Step 202 is negative, i.e., the TCP timestamp is not enabled for the first flow and the second flow, the method proceeds to Step 210 where a first monotonic timestamp-ID (MTSID) sequence is extracted from the first flow. Specifically, the first MTSID sequence includes capture-timestamp-and-IP-ID-pairs (e.g., (capture timestamp, IP-ID)) based on the capture timestamp and Internet-protocol-identification-field value (i.e., IP-ID) assigned to each packet of the first flow by the host generating the first flow. For example, each element (or point) in the first MTSID sequence is a (capture timestamp, IP-ID) pair of a packet in the first flow. Accordingly, multiple (capture timestamp, IP-ID) pairs of multiple packets in the first flow form the MTSID sequence according to the monotonic values (i.e., monotonically increasing or decreasing values) of the (capture timestamp, IP-ID) pairs. Similarly, a second MTSID sequence is extracted from the second flow. Specifically, the second MTSID sequence includes capture-timestamp-and-IP-ID-pairs based on the capture timestamp and the IP-ID assigned to each packet of the second flow. In one or more embodiments, if monotonic IP-ID values are not found in the first flow and the second flow (i.e., the first MTSID sequence and the second MTSID sequence can not be extracted from the first flow and the second flow), another set of packets is captured, from the network traffic using the packet capturing device, based at least on the common source IP address shared by each packet of the another set of packets. In one or more embodiments, a portion of another set of packets is identified as a third flow, and another portion of the another set of packets is identified as a fourth flow. Accordingly, the first MTSID sequence and the second MTSID sequence are extracted from the third flow and the fourth flow, respectively.

In Step 211, the first MTSID sequence and the second MTSID sequence are compared based on a pre-determined criterion to generate a result. Accordingly, based on this result, it is determined whether the flows (e.g., the first and second flows, or the third and fourth flows) represented by first MTSID sequence and the second MTSID sequence are generated by the same host.

Although Steps 210 and 211 are described based specifically on using at least the IP-ID to determine whether the flows are generated by a single host of the network, other monotonically increasing/decreasing field values (for instance, some IPv6 implementation might monotonically increase the Flow Label field of all flows) found in packets of a flow may also be used. Specifically, IPv6 defines "flow label" field in the IP header. The flow label may be used to provide special service to real-time applications special. In one or more embodiments, the flow label is set to a non-zero value to serve as an indication to routers and switches with multiple outbound paths that these packets are to stay on the same path so that they will not be reordered. Depending on the specific implementation of an OS (i.e., operating system), the flow label field may be used to de-multiplex flows generated by multiple hosts behind a NAT device. For example, the IPv6 stack of an OS may increase the value of a global counter by one for each new flow, and use the counter value as the flow label of the new flow. For such an implementation, if all the packets of a flow $f_1$ from a particular source IP have flow label $Flabel_1$, and packets of a flow $f_2$ from the same source IP have flow label $Flabel_2$, and $Flabel_2=Flabel_1+1$ or $Flabel_2=Flabel_1+n$, where n<t, where t is a predefined threshold, it is determined that flow $f_2$ and $f_1$ are from the same host behind a NAT device. On the other hand, if it is observed that another flow $f_3$ from the source IP where the flow label value $Flabel_3$ of packets in flow $f_3$ is sufficiently different from $Flabel_1$ and $Flabel_2$ (e.g., the starting time of flow $f_3$ is later than the starting time of flow $f_1$ and $f_2$, but $Flabel_3$ is smaller than $Flabel_1$ and $Flabel_2$), the flow $f_3$ is determined to be generated by a different host behind that NAT device.

Moreover, although Steps 201 through 211 are described based specifically on using at least the source timestamp and IP-ID to determine whether the flows are generated by a single host of the network, more generally, any protocol field (including but not limited to the source timestamp and IP-ID fields) found in packets of a flow may be used if the values assigned to the protocol field are generated by the host based on a pre-determined algorithm, such as the TCP timestamp generation algorithm, IP-ID generation algorithm, IPv6 algorithm for generating flow labels, or other algorithm that is currently known or may be developed in the future. In particular, the pre-determined algorithm assigns changing values to the packets such that the assigned values may be used to sequence the packets in the flow. As noted above, a first portion of captured packets may be identified as a first flow and a second portion of the captured packets may be identified as a second flow based at least on a common source IP address shared by each packet of the first flow and the second flow. Accordingly, a set of values, each assigned to a pre-determined protocol field in a packet in the first flow, are extracted and analyzed to determine that the set of values are assigned based on a pre-determined algorithm to the pre-determined protocol field by a device (e.g., the aforementioned host) generating the first flow. Further, the second flow is analyzed to determine that the pre-determined algorithm is not used to assign values to the pre-determined protocol field of the second flow in a consistent manner as the first flow. Based on such result of analyzing the first flow and the second flow, it is then determined that the first flow and the second flow are generated by different hosts of the network. In one or more embodiments, when the pre-determined algorithm is not used to assign values to the pre-determined protocol field of the second flow in a consistent manner as the first flow, the pre-determined protocol field may (i) contain a fixed value for all packets in the second flow, (ii) contain random values for all packets in the second flow, (iii) not be present (i.e., included) for any packet in the second flow, (iv) contain values assigned based on another pre-determined algorithm that is different than the pre-determined algorithm used by the device generating the first flow, or (v) contain values assigned based on the pre-determined algorithm that is configured using different parameters than the pre-determined algorithm used by the device generating the first flow. In other words, if any of these five conditions is detected, it is determined that the pre-determined algorithm is not used to assign values to the pre-determined protocol field of the second flow in a consistent manner as the first flow.

In an example scenario, the determination (i.e., analysis result) that (i) a protocol field always contains the same value in the packets of a given flow, (ii) the same protocol field has a changing value in the packets of another flow, and (iii) the two flows share the same source IP address may be used to conclude that the two flows are generated by different hosts. For example, the IP-ID field may contain the value 0 (or another fixed value) in the IP header of all the packets of a flow, while the IP-ID field may contain an ever-changing value (e.g., increasing) in the IP header of the packets of another flow. In this case it is concluded that the two flows are generated by different hosts even though the two flows share the same source IP address. For example, the source IP address shared by the two flows may be the IP address of a NAT device coupled to two different hosts that generate the two flows separately.

In another example scenario, the packets of a first flow contain a header field that is not contained in the packet of a second flow. For example, the TCP segments in the IP packets of a first flow contain a TCP time-stamp option, while the TCP segments in the packets of a second flow do not contain a TCP time-stamp option. In this case, it is concluded that the two flows are generated by different hosts even though the two flows share the same source IP address. Similar to the previous example scenario, the source IP address shared by the two flows may be the IP address of a NAT device coupled to two different hosts that generate the two flows separately.

Examples of using the method described above to identify flows in the network traffic that are generated by separate hosts using the same source IP address are further described in FIGS. 3.1-3.6 below.

FIGS. 3.1-3.6 show various examples in accordance with aspects of the invention. In particular, FIGS. 3.1-3.6 described an example system, referred to as IP-Demultiplex system that is based on the system (100) described in reference to FIG. 1 and the method described in reference to FIG. 2 above. In particular, the examples described in FIGS. 3.1-3.6 focus on detecting the presence of a Network Address Translation (NAT) device, and classifying the packets from the NAT device according to which hosts behind the NAT generating those packets.

Network Address Translation (NAT) is the process of modifying IP address information in IPv4 headers when transiting across a traffic routing device. It is often used to hide an entire IP address space, usually consisting of private IP addresses, behind a single IP address in another (usually public) address space. To avoid ambiguity in the handling of returned packets, a one-to-many NAT must alter higher level information such as TCP/UDP ports in outgoing communications and must maintain a translation table so that return packets can be correctly translated back. The TCP timestamp option is used for two distinct mechanisms: round trip time measurement and protecting against wrapped sequences. Each OS implementation increments this value at a specific rate ranging from 1 Hz to 1000 Hz. Many operating systems use zero as the initial value for TCP timestamp after rebooting. However, Windows operating system uses a random initial value. The "Identification" is a 16-bit field in IP header, which is primarily used for uniquely identifying fragments of an original IP packet. The "Identification" field of IP packets generated in some operating systems contains the value of a global counter that is incremented by one each time a new packet is generated. The "Identification" field of IP packets generated in some other operating systems (e.g., ANDROID/LINUX, IOS/OSX, etc.) contains a randomly generated number.

FIG. 3.1 shows an example deployment scenario of the IP-demultiplex system (310) generating demultiplexed IP traffic (315). A NAT device (311) performs network translation for multiple hosts, depicted as $h_1$ (312a), $h_2$ (312b), through $h_n$ (312n). The packets generated from those hosts are modified by the NAT device (311) and transmitted over a network (313). The IP-Demultiplex system (311) is attached to a router/switch (314) and passively sniffs packets for analysis without interfering the packets forwarding at the router/switch (314). The NAT device (311) may be at a remote location from the IP-Demultiplex system (310).

FIG. 3.2 shows the basic work flow of the IP-Demultiplex system (310) described above. The incoming IP packets (321) are filtered using filtering mechanism performed by the packet filter (322). Using the packet filter (322), the IP packets (321) may be filtered to retain only the portion (i.e., targeted packets (322a) with IP addresses in a "blacklist," which may be a pre-defined set of addresses to be focused on for detecting the presence of NAT devices and for demultiplexing the network traffic therefrom. In block (323), the targeted packets (322a) are grouped into flows (323a) according to the 5-tuple. In addition, each packet p in incoming IP packets (321) and/or the targeted packets (322a) may be assigned the real time (referred to as $t_p$) at which the packet p is observed by the IP-Demultiplex system (310). For example, the real time (referred to as $t_p$) may be assigned by a sniffer device that captures the IP packets (321) from the network traffic, or assigned by the packet filter (322).

In block (324), the packet headers for each flow are examined to select a field from a predefined set of candidate fields for associating the flow to a host (e.g., $h_1$ (312a), $h_2$ (312b), $h_n$ (312n), etc.) behind the NAT device (311). In general, the selected packet header field selected in block (324) may be any field having a sequential value with respect to the packet sequence in the flow. Examples of such selected packet header field include TCP timestamp (denoted as TCP TS) and IP Identification (denoted as IP-ID) fields.

TCP is a commonly used transport protocol in the Internet and TCP Timestamp option is enabled by most modern operating systems except MICROSOFT WINDOWS®. MICROSOFT WINDOWS® uses a global counter to generate the Identification field in the IP header of each packet. In other words, MICROSOFT WINDOWS* uses the value of a 16-bit counter as the IP-ID of each packet and increments the counter after each packet is generated. The (IP-Demultiplex system 310) uses the TCP TS and IP-ID fields as the aforementioned selected packet header field. In particular, examining the IP-ID fields is effective in demultiplexing packets generated from hosts running MICRO- SOFT WINDOWS®. In contrast, examining the TCP timestamp is effective in demultiplexing packets generated from unix-like operating systems, such as ANDROID/LINUX AND IOS/OSX.

TABLE 1 shows the algorithm (i.e., algorithm 1) of selecting which field in the packet header to be used for sequence testing. When TCP timestamp is present in the packets (i.e., present in each packet header of all packets) of a flow f, TCP timestamp is selected for demultiplexing. IP-ID is used when TCP timestamp is not available in the packets of a flow f. Before using the IP-ID, it is determined whether the IP-ID values of packets in a flow f have the sequential property because some operating systems use random IP-ID for every new IP packet. Whether a flow f has randomized IP-ID may be determined by comparing the order of packets generated at the source host with the IP-ID value in each packet. For a flow f, all packets are sorted according to some a priori knowledge on how packets should be ordered, the IP-ID values of the ordered packets are checked to see if it is monotonically increasing, which indicates IP-ID values of packets in flow f are not randomly generated.

TABLE 1

Algorithm 1: The algorithm skeleton for selecting
which field in packet header to de-multiplex a flow.

| | |
|---|---|
| | Input: an assembled flow f |
| 1 | if packets in f have TCP timestamp then |
| 2 |     \|_ select TCP TS for de-multiplexing; |
| 3 | else if packets in f have non-random IP ID then |
| 4 |     \|_ select IP ID For de-multiplexing; |
| 5 | else |
| 6 |     \|_ cannot de-multiplex flow f; |

In the following discussion, each IP packet is represented by a data point p. A data point is a 2-tuple $(t_p, v_p)$, where $t_p$ denotes the real time when packet p is captured by a sniffer device, and $v_p$ is a numeric value of a specific field in the packet header of p. A sequence s is a series of data points ordered by their real time $s=\{p_1, p_2, \ldots\}$. The data points in a sequence have the following property:

$$\forall p_i, p_j \in s, v_{p_i} \leq v_{p_j} \Longleftrightarrow t_{p_i} \leq t_{p_j} \quad (1)$$

In other words, the $v$ values of all data points (e.g., $v_{p_i}$ of data point $p_i$, $v_{p_j}$ of data point $p_j$) in a sequence s are monotonically increasing or monotonically decreasing. For sequence s, let head(s) and tail(s) denote the first and the last data point, respectively, in the sequence. Let S be a set of sequences $S=\{S_1, S_2, \ldots\}$. Each sequence $S_i \in S$ represents a sequential pattern found in the flows generated from the same host $h_i$. For a flow f, the IP-Demultiplex system (310) determines whether flow f is from a host already detected by the system, or f is from a new host behind the NAT device (311). This is done by first extracting a sequence $s_f$ from packets of flow f and testing the sequential property of $s_f$ against all the sequences in S.

Once a field is selected in block (324), the flows (323a) are processed by one or more demultiplexing modules (e.g., demultiplexing module (325a), demultiplexing module (325b), etc.) to remove the abnormal packets from the flows and perform the demultiplexing to generate the demultiplexing results (326a), (326b), etc. The IP-Demultiplex system (310) has multiple demultiplexing modules (e.g., demultiplexing module (325a), demultiplexing module (325b), etc.), each dedicated for one selected field in packet header. In particular, the algorithm for cleaning and demultiplexing flows (323a) is specific to the particular selected packet header field. For example, the demultiplexing module (325a) may be dedicated for the TCP timestamp field. In another example, the demultiplexing module (325b) may be dedicated for the IP-Identification field. Additional details of the demultiplexing module (325a) for the TCP timestamp field and the demultiplexing module (325b) for the IP-Identification field are described below.

In the scenario of demultiplexing via TCP TS using the demultiplexing module (325a), consider a flow f within the flows (323a) where packets of flow f have the TCP timestamp option enabled. The IP-Demultiplex system (310) first cleans up flow f by removing those out-of-order packets. Let $p_i$ and $p_j$ be two packets in flow f. If $t_{p_i} < t_{p_j}$ and $v_{p_i} > v_{p_j}$, meaning that $p_j$ is generated earlier than $p_i$ but is observed later by IP-Demultiplex system (310), packet $p_j$ is an out-of-order packet and excluded from the flow f to avoid inaccuracy in later processing. The pseudo-code of an example algorithm is shown in TABLE 2 as Algorithm 2

TABLE 2

Algorithm 2: The algorithm skeleton for
cleaning up a flow with TCP timestamps.

| | |
|---|---|
| | Input flow f with TCP timestamp option enabled |
| | Output: cleaned up flow f̂ |
| 1 | sort packets in f on their real time $t_p$ into flow f̂; |
| 2 | foreach packet p ∈ f̂ do |
| 3 |   \| $p_{next}$ = the packet next to p in f̂; |
| 4 |   \| if $v_{p_{next}} < v_p$ then |
| 5 |   \|_\|_ exclude $p_{next}$ from f̂; |
| 6 | return f̂; |

After cleaning up flow f into f̂, the demultiplexing module (325a) extracts a sequence $s_f$ from the flow f̂. The sequence $s_f$ is a series of data points where each data point $p=(t_p, v_p)$ represents two pieces of information about a packet p in f̂: $t_p$ is real time at which p is observed by the IP-Demultiplex system (310), and $v_p$ is the TCP TS value of packet p. Let $S_{TS}$ be the set of TCP TS sequences that the demultiplexing module (325a) has learned. Initially $S_{TS}$ is empty so sequence $s_f$ is added into the set as a new sequence, representing that a host behind the NAT device (311) is observed. In case $S_{TS}$ is not empty, the demultiplexing module (325a) determines whether flow f is from a host observed before, or from a newly found host. The heuristics for making this determination is described as the following. In the discussion below regarding two sequences $S_f$ and $s_k$, one of the leading data point (e.g., the first data point) of the sequence $s_f$ has the real time $t_{head(sf)}$ and TCP TS value $v_{head(sf)}$, while one of the trailing data point (e.g., the last data point) of another sequence $s_k$ has the real time $t_{tail(sk)}$ and TCP TS value $v_{tail(sk)}$.

If there exists a sequence $S_k \in S_{TS}$, such that $s_f$ starts before $s_k$ ends, and the TCP TS value $v_{head(sf)}$ of the first point in $s_f$ is within the range of the TCP TS values $v_{head(sk)}$ and $v_{tail(sk)}$ of $s_k$, i.e., $$t_{head(sf)} \in [t_{head(S_k)}, t_{tail(S_k)}]$$

and $$v_{head(sf)} \in [v_{head(S_k)}, v_{tail(S_k)}], \quad (2)$$

then $s_f$ and $s_k$ are merged into a new sequence $s_k'$. In case multiple such $s_k$ satisfy the above equation (2) in $S_{TS}$, the system makes a best effort guess according to certain predefined rules, such as picking the one with the least out-of-order points is selected.

FIG. 3.3 shows an example of demultiplexing via TCP TS using the demultiplexing module (325a) based on equation (2). As shown in FIG. 3.3, the demultiplexing module (325a) has previously learned sequence m (332) and sequence n (333) that collectively form the set $S_{TS}$. As shown in FIG. 3.3, the sequence m (332) spans a range of approximately 0-300 seconds in packet real time along the horizontal axis and approximately 40000-100000 in packet TCP timestamp value along the vertical axis. Similarly, the sequence n (333) spans a range of approximately 0-650 seconds in packet real time along the horizontal axis and approximately 0-13000 in packet TCP timestamp value along the vertical axis.

A sequence f (331) (i.e., $s_f$) is found in a new flow f where sequence f (331) starts before the sequence n (333) (i.e., $s_k$) ends. In particular, the sequence f (331) spans a range of approximately 510-900 seconds in packet real time along the horizontal axis and approximately 12000-20000 in packet TCP timestamp value along the vertical axis. As shown in FIG. 3.3, the first data point in the sequence f (331) (i.e., $s_f$) is $(T_{head(sf)}, V_{head(sf)})$ (331a), the first data point in the sequence n (333) (i.e., $s_k$) is $(T_{head(sk)}, V_{head(sk)})$ (333a), while the last data point in the sequence n (333) (i.e., $s_k$) is $(T_{tail(sk)}, V_{tail(sk)})$ (333b). In particular, the value $T_{head(sf)}$ fits into the range between $T_{head(sk)}$ and $T_{tail(sk)}$ corresponding to the equation (2). Similarly, the value $V_{head(sf)}$ fits into the range between $V_{head(sk)}$ and $V_{tail(sk)}$ corresponding to the equation (2). Accordingly, the sequence f (331) and sequence n (333) are merged based on the heuristics described above. As a result, the flow f is considered to be from the host that generates flows where the sequence n (333) was previously found.

Returning to the discussion of FIG. 3.2, if $s_f$ starts later than all sequences in $S_{TS}$, i.e., $$t_{head(sf)} > t_{head(S_i)}, \forall S_i \in S_{TS}, \quad (3)$$

for each $s_i$ in $S_{TS}$, the demultiplexing module (325a) makes prediction on what the TCP TS value should be at time $t_{head(sf)}$. The maximum possible value is predicted as $$TS_{max} = 1000(t_{head(sf)} - t_{tail(S_k)}) + v_{tail(S_k)} + \delta, \quad (4)$$

where 1000 Hz is the maximum frequency of TCP timestamp defined by the standard and commonly observed in almost all implementations, and δ is a small positive value for accommodating the difference in packet transmission delay. The minimum possible value is predicted as $$TS_{min} = \max(v_{tail(S_k)}, t_{head(sf)} - t_{tail(S_k)} + v_{tail(S_k)} - \delta). \quad (5)$$

In case $V_{head(sf)}$ fits into the range predicted by more than one sequences in $S_{TS}$, the one with the largest $V_{tail(sk)}$ is selected. If a sequence $S_k \in S_{TS}$ is selected, sequence $s_k$ is updated by merging $s_f$ into $s_k$, and flow f is considered to be from the host that generates flows where $s_k$ is extracted. Otherwise, flow f is considered to be from a new host and sequence $s_f$ is added into $S_{TS}$ as a new sequence.

FIG. 3.4 shows an example of demultiplexing via TCP TS using the demultiplexing module (325a) based on equations (3), (4), and (5). As shown in FIG. 3.4, the demultiplexing module (325a) has previously learned sequence m (342) and sequence n (343) that collectively form the set $S_{TS}$. As shown in FIG. 3.4, the sequence m (342) spans a range of approximately 0-300 seconds in packet real time along the horizontal axis and approximately 40000-100000 in packet TCP timestamp value along the vertical axis. Similarly, sequence n (343) spans a range of approximately 0-650 seconds in packet real time along the horizontal axis and approximately 0-13000 in packet TCP timestamp value along the vertical axis.

A sequence f (341) (i.e., $s_f$) is found in a new flow f where sequence f (341) starts later than all sequences (i.e., sequence m (342) and sequence n (343)) in $S_{TS}$. In particular, the sequence f (341) spans a range of approximately 700-900 seconds in packet real time along the horizontal axis and approximately 14000-20000 in packet TCP timestamp value along the vertical axis. The first data point in the sequence f (341) is (Thead(sf), Vhead(sf)) (341a) where the value Vhead(sf) fits into the range (343c) predicted by the TSmax (343a) and TSmin (343b) that are calculated based on the last data point of the sequence n (343) using the equation (4) and equation (5), respectively. Accordingly, the sequence f (341) and sequence n (343) are merged based on the heuristics described above. As a result, the flow f is considered to be from the host that generates flows where the sequence n (343) was previously found.

Returning to the discussion of FIG. 3.2, in the scenario of demultiplexing via IP-ID using the demultiplexing module (325b), the IP-Demultiplex system (310) first removes those out-of-order packets using an algorithm similar to Algorithm 2 shown in TABLE 2 above. After cleaning up flow f into f', the demultiplexing module (325b) extracts a sequence $s_f$ where each data point p=$(t_p, v_p)$ represents two pieces of information about a packet p in f':$t_p$ is real time at which p is observed by the IP-Demultiplex system (310), and $v_p$ is the IP-ID value of packet p. Let $S_{ID}$ be the set of IP-ID sequences that the demultiplexing module (325b) has learned. If $S_{ID}$ is empty, sequence $s_f$ is added into $S_{ID}$ as a new sequence. In case $S_{ID}$ is not empty, the demultiplexing module (325b) determines whether flow f is from a host observed before, or is from a newly found host.

If there exists a sequence $S_k \in S_{ID}$, such that $s_f$ starts before $s_k$ ends, and the IP-ID value $v_{head(sf)}$ of the first point in $s_f$ is within the range of the IP-ID values $v_{head(sk)}$ and $v_{tail(sk)}$ of $s_k$, i.e., $$t_{head(sf)} \in [t_{head(S_k)}, t_{tail(S_k)}]$$

and $$v_{head(sf)} \in [v_{head(S_k)}, v_{tail(S_k)}], \quad (6)$$

then $s_f$ and $s_k$ are merged into a new sequence $s_k'$. In case multiple such $s_k$ satisfy the above equation (6) in $S_{ID}$, the one with the least out-of-order points is selected.

FIG. 3.5 shows an example of demultiplexing via IP-ID using the demultiplexing module (325b) based on equation (6). As shown in FIG. 3.5, the demultiplexing module (325b) has previously learned sequence m (352) and sequence n (353) that collectively form the set $S_{ID}$. As shown in FIG. 3.5, the sequence m (352) spans a range of approximately 0-60 seconds in packet real time along the horizontal axis and approximately 44490-44500 in packet ID identification (ID) value along the vertical axis. Similarly, the sequence n (353) spans a range of approximately 0-68 seconds in packet real time along the horizontal axis and approximately 41700-42150 in packet IP-ID value along the vertical axis.

A sequence f (351) (i.e., $s_f$) is found in a new flow f where sequence f (351) starts before the sequence n (353) (i.e., $s_k$) ends. In particular, the sequence f (351) spans a range of approximately 65-70 seconds in packet real time along the horizontal axis and approximately 42100-42200 in packet IP-ID value along the vertical axis. As shown in FIG. 3.5, the first data point in the sequence f (351) (i.e., $s_f$) is $(T_{head(sf)}, V_{head(sf)})$ (351a), the first data point in the sequence n (353) (i.e., $s_k$) is $(T_{head(sk)}, V_{head(sk)})$ (353a), while the last data point in the sequence n (353) (i.e., $s_k$) is $(T_{tail(sk)}, V_{tail(sk)})$ (353b). In particular, the value $T_{head(sf)}$ fits into the range between $T_{head(sk)}$ and Ttail(sk) corresponding to the equation (6). Similarly, the value $V_{head(sf)}$ fits into the range between $V_{head(sk)}$ and $V_{tail(sk)}$ corresponding to the equation (6). Accordingly, the sequence f (351) and sequence n (353) are merged based on the heuristics described above. As a result, the flow f is considered to be from the host that generates flows where the sequence n (353) was previously found.

Returning to the discussion of FIG. 3.2, in the scenario of demultiplexing via IP-ID using the demultiplexing module (325b), in case $s_f$ starts after all sequences in $S_{ID}$ end, i.e., $$t_{head(sf)} > t_{head(S_i)}, \forall S_i \in S_{ID} \qquad (7)$$

for each $s_i$ in $S_{ID}$ no further determination is made. In particular, it is not predicted from a sequence $S_k \in S_{ID}$ what the IP-ID value may be if a packet is generated by the same host at time $t_{head(sf)}$. The reason is that MICROSOFT WINDOWS® increases the IP-ID value after every new packet is generated and packets may be generated at any rate by the host. Therefore, the demultiplexing module (325b) merges the sequence $s_f$ with $S_k \in S_{ID}$ if (1) $V_{head(sf)}$ is larger than $V_{tail(sk)}$ (condition (7.1)) and (2) $V_{tail(sk)}$ is the closest one to $V_{head(sf)}$ among all $S_i \in S_{ID}$ where $v_{head(s_j)} - v_{tail(S_i)} > 0$ (condition (7.2)). When $s_f$ is merged with $s_k$, f is considered to be from the host that generates flows where $s_k$ is extracted. Otherwise, flow f is considered to be from a new host and sequence $s_f$ is added into $S_{ID}$ as a new sequence.

FIG. 3.6 shows another example of demultiplexing via IP-ID using the demultiplexing module (325b). As shown in FIG. 3.6, the demultiplexing module (325b) has previously learned sequence m (362) and sequence n (363) that collectively form the set $S_{ID}$. As shown in FIG. 3.6, the sequence m (362) spans a range of approximately 0-60 seconds in packet real time along the horizontal axis and approximately 44490-44500 in packet IP-ID value along the vertical axis. Similarly, the sequence n (363) spans a range of approximately 0-68 seconds in packet real time along the horizontal axis and approximately 41700-42150 in packet IP-ID value along the vertical axis.

A sequence f (361) (i.e., $s_f$) is found in a new flow f where sequence f (361) starts later than all sequences (i.e., sequence m (362) and sequence n (363)) in $S_{ID}$. In particular, the sequence f (361) spans a range of approximately 75-80 seconds in packet real time along the horizontal axis and approximately 42160-42200 in packet IP-ID value along the vertical axis. As shown in FIG. 3.6, the first data point in the sequence f (351) (i.e., $s_f$) is ($T_{head(sf)}$, $V_{head(sf)}$) (361a), the first data point in the sequence n (353) (i.e., $s_k$) is ($T_{head(sk)}$, $V_{head(sk)}$) (363a), while the last data point in the sequence n (353) (i.e., $s_k$) is ($T_{tail(sk)}$, $V_{tail(sk)}$) (363b). In particular, the value $V_{head(sf)}$ is larger than $V_{tail(sk)}$ corresponding to the condition (7.1) above. In addition, condition (7.2) is also true comparing to any other $S_i \in S_{ID}$ where $v_{head(s_j)} - v_{tail(S_i)} > 0$. Accordingly, the sequence f (361) and sequence n (363) are merged based on the heuristics described above. As a result, the flow f is considered to be from the host that generates flows where the sequence n (363) was previously found.

Figure 4:
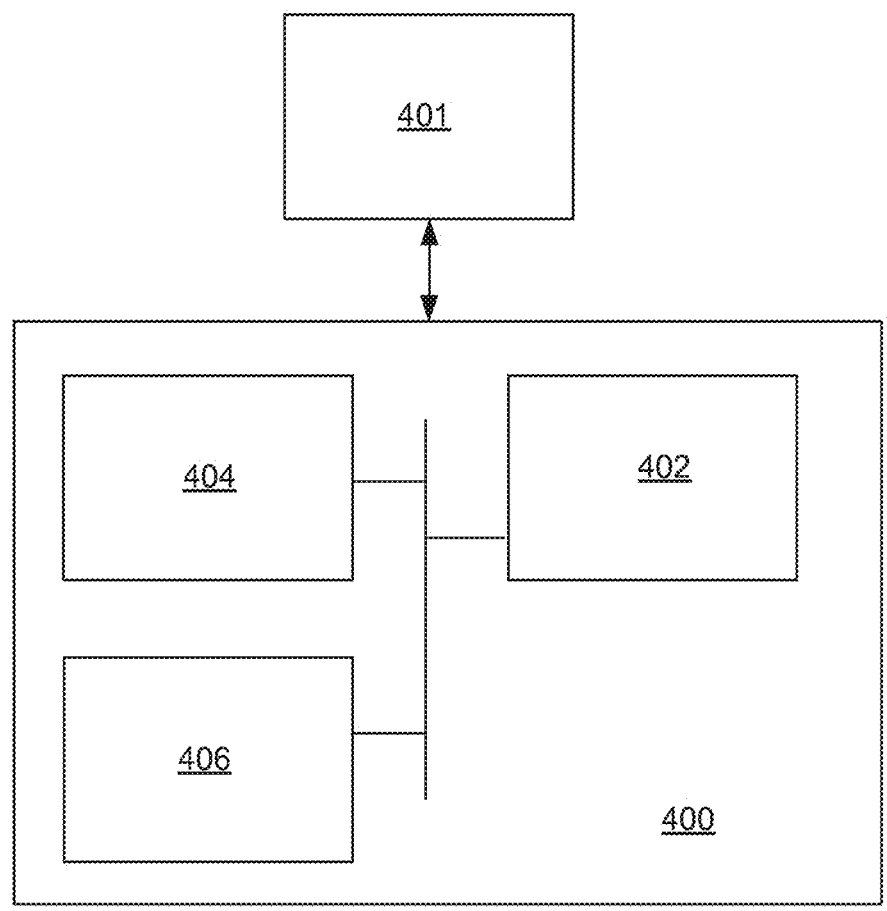
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for profiling network traffic of a network, comprising:
   capturing, from the network traffic using a packet capturing device, a plurality of packets;
   identifying a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device;
   comparing, by a processor and based on a pre-determined criterion, a first monotonic timestamp-pair (MTSP) sequence and a second MTSP sequence to generate a result, wherein comparing the first MTSP sequence and the second MTSP sequence includes:
      determining whether a capture timestamp proximity condition is met;
      if the capture timestamp proximity condition is met, determining whether a source timestamp proximity condition is met; and if the capture timestamp proximity condition is not met, determining whether the second MTSP matches a predicted source timestamp range for the second flow generated based on the first flow;
wherein the capture timestamp proximity condition requires a range of capture timestamps of the first MTSP and a range of capture timestamps of the second MTSP overlap each other and the source timestamp proximity condition requires the range of source timestamps of the first MTSP and the range of source timestamps of the second MTSP overlap each other;
determining, based on the result, whether the first flow and the second flow are generated by a single host of the network, wherein determining whether the first flow and the second flow are generated by a single host of the network includes determining whether both the capture timestamp proximity condition and the source timestamp proximity condition is met or determining that the MTSP matches the predicted source timestamp range for the second flow; and
based on determining that the first flow and the second flow are generated by a single host of the network, merging the first and second flow into a single flow.

2. The method of claim 1, further comprising:
determining that a transmission control protocol (TCP) timestamp option is enabled in the first portion and the second portion of the plurality of packets,
wherein the source timestamp comprises a TCP timestamp, and
wherein extracting the first MTSP sequence and the second MTSP sequence is in response to the determining.

3. The method of claim 1, wherein comparing the first MTSP sequence and the second MTSP sequence comprises:
identifying a source timestamp proximity and a capture timestamp proximity between the first MTSP sequence and the second MTSP sequence,
wherein the first flow and the second flow are determined, in response to identifying the source timestamp proximity and the capture timestamp proximity, to be generated by a single host of the network.

4. The method of claim 1, wherein comparing the first MTSP sequence and the second MTSP sequence comprises:
identifying a capture timestamp proximity between the first MTSP sequence and the second MTSP sequence; and
identifying a source timestamp segregation between the first MTSP sequence and the second MTSP sequence,
wherein the first flow and the second flow are determined, in response to identifying the capture timestamp overlap and the source timestamp segregation, to be generated by at least two hosts of the network.

5. The method of claim 1, wherein comparing the first MTSP sequence and the second MTSP sequence comprises:
identifying a capture timestamp segregation between the first MTSP sequence and the second MTSP sequence; and
determining, based at least on the capture timestamp segregation, a predicted source timestamp range of the second MTSP sequence,
wherein the result identifies a match between the predicted source timestamp range and the second MTSP sequence, and
wherein the first flow and the second flow are determined, in response to identifying the match, to be generated by a single host of the network.

6. The method of claim 1, wherein comparing the first MTSP sequence and the second MTSP sequence comprises:
identifying a capture timestamp segregation between the first MTSP sequence and the second MTSP sequence; and
determining, based at least on the capture timestamp segregation, a predicted source timestamp range of the second MTSP sequence,
wherein the result identifies a mismatch between the predicted source timestamp range and the second MTSP sequence, and
wherein the first flow and the second flow are determined, in response to identifying the mismatch, to be generated by at least two hosts of the network.

7. The method of claim 1, further comprising:
capturing, from the network traffic using the packet capturing device, another plurality of packets;
identifying a third portion of another plurality of packets as a third flow and a fourth portion of the another plurality of packets as a fourth flow, wherein the third flow and the fourth flow are identified based at least on the common source IP address shared by another each packet of the another plurality of packets, wherein said another each packet is assigned an Internet-protocol-identification-field value by another device generating said another each packet and further assigned the capture timestamp by the packet capturing device, wherein the Internet-protocol-identification-field value is referred to as an IP-ID;
comparing, based on another pre-determined criterion, a first monotonic timestamp-ID (MTSID) sequence and a second MTSID sequence to generate another result; and
determining, based on the another result, whether the third flow and the fourth flow are generated by another single host of the network.

8. A system for profiling network traffic of a network, comprising: a processor configured to capture, from the network traffic, a plurality of packets; memory comprising instructions executable by the processor, wherein the instructions comprises:
the processor configured to identify a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device;
the processor configured to: compare, based on a pre-determined criterion, a first monotonic timestamp-pair (MTSP) sequence and a second MTSP sequence to generate a result, wherein comparing the first MTSP sequence and the second MTSP sequence includes: determining whether a capture timestamp proximity condition is met; if the capture timestamp proximity condition is met, determining whether a source timestamp proximity condition is met; and if the capture timestamp proximity condition is not met, determining whether the second MTSP matches a predicted source timestamp range for the second flow generated based on the first flow; wherein the capture timestamp proximity condition requires a range of capture timestamps of the first MTSP and a range of capture timestamps of the second MTSP overlap each other and the source timestamp proximity condition requires the range of source timestamps of the first MTSP and the range of source timestamps of the second MTSP overlap each other; and determine, based on the result, whether the first flow and the second flow are generated by a single host of the network, wherein determining whether the first flow and the second flow are generated by a single host of the network includes determining whether both the capture timestamp proximity condition and the source timestamp proximity condition is met or determining that the MTSP matches the predicted source timestamp range for the second flow;

the processor configured to: merge, based on determining that the first flow and the second flow are generated by a single host of the network, the first and second flow into a single flow; and a data repository configured to store the first MTSP sequence, the second MTSP sequence, and the result.

9. The system of claim 8, further comprising: the processor to determine that a transmission control protocol (TCP) timestamp option is enabled in the first portion and the second portion of the plurality of packets, wherein the source timestamp comprises a TCP timestamp, and wherein extracting the first MTSP sequence and the second MTSP sequence is in response to the determining.

10. The system of claim 8, wherein comparing the first MTSP sequence and the second MTSP sequence comprises:
identifying a source timestamp proximity and a capture timestamp proximity between the first MTSP sequence and the second MTSP sequence,
wherein the first flow and the second flow are determined, in response to identifying the source timestamp proximity and the capture timestamp proximity, to be generated by a single host of the network.

11. The system of claim 8, wherein comparing the first MTSP sequence and the second MTSP sequence comprises:
identifying a capture timestamp proximity between the first MTSP sequence and the second MTSP sequence; and
identifying a source timestamp segregation between the first MTSP sequence and the second MTSP sequence,
wherein the first flow and the second flow are determined, in response to identifying the capture timestamp overlap and the source timestamp segregation, to be generated by at least two hosts of the network.

12. The system of claim 8, wherein comparing the first MTSP sequence and the second MTSP sequence comprises:
identifying a capture timestamp segregation between the first MTSP sequence and the second MTSP sequence; and
determining, based at least on the capture timestamp segregation, a predicted source timestamp range of the second MTSP sequence,
wherein the result identifies a match between the predicted source timestamp range and the second MTSP sequence, and
wherein the first flow and the second flow are determined, in response to identifying the match, to be generated by a single host of the network.

13. The system of claim 8, wherein comparing the first MTSP sequence and the second MTSP sequence comprises:
identifying a capture timestamp segregation between the first MTSP sequence and the second MTSP sequence; and
determining, based at least on the capture timestamp segregation, a predicted source timestamp range of the second MTSP sequence, wherein the result identifies a mismatch between the predicted source timestamp range and the second MTSP sequence, and
wherein the first flow and the second flow are determined, in response to identifying the mismatch, to be generated by at least two hosts of the network.

14. The system of claim 8, further comprising: the processor to capture, from the network traffic using the packet capturing device, another plurality of packets; identify a third portion of another plurality of packets as a third flow and a fourth portion of the another plurality of packets as a fourth flow, wherein the third flow and the fourth flow are identified based at least on the common source IP address shared by another each packet of the another plurality of packets, wherein said another each packet is assigned an Internet-protocol-identification-field value by another device generating said another each packet and further assigned the capture timestamp by the packet capturing device, wherein the Internet-protocol-identification-field value is referred to as an IP-ID; the processor to compare, based on another pre-determined criterion, a first monotonic timestamp-ID (MTSID) sequence and a second MTSID sequence to generate another result; and the processor to determine, based on the another result, whether the third flow and the fourth flow are generated by another single host of the network.

15. A non-transitory computer readable medium embodying instructions for profiling network traffic of a network, the instructions when executed by a processor comprising functionality for:
capturing, from the network traffic using a packet capturing device, a plurality of packets;
identifying a first portion of the plurality of packets as a first flow and a second portion of the plurality of packets as a second flow, wherein the first flow and the second flow are identified based at least on a common source IP address shared by each packet of the first flow and the second flow, wherein said each packet is assigned a source timestamp by a device generating said each packet and further assigned a capture timestamp by the packet capturing device;
comparing, based on a pre-determined criterion, a first monotonic timestamp-pair (MTSP) sequence and a second MTSP sequence to generate a result, wherein comparing the first MTSP sequence and the second MTSP sequence includes:
determining whether a capture timestamp proximity condition is met;
if the capture timestamp proximity condition is met, determining whether a source timestamp proximity condition is met; and
if the capture timestamp proximity condition is not met, determining whether the second MTSP matches a predicted source timestamp range for the second flow generated based on the first flow;
wherein the capture timestamp proximity condition requires a range of capture timestamps of the first MTSP and a range of capture timestamps of the second MTSP overlap each other and the source timestamp proximity condition requires the range of source timestamps of the first MTSP and the range of source timestamps of the second MTSP overlap each other;
determining, based on the result, whether the first flow and the second flow are generated by a single host of the network, wherein determining whether the first flow and the second flow are generated by a single host of the network includes determining whether both the capture timestamp proximity condition and the source timestamp proximity condition is met or determining that the MTSP matches the predicted source timestamp range for the second flow; and based on determining that the first flow and the second flow are generated by a single host of the network, merging the first and second flow into a single flow.

16. The non-transitory computer readable medium of claim 15, the instructions when executed by the processor further comprising functionality for:

determining that a transmission control protocol (TCP) timestamp option is enabled in the first portion and the second portion of the plurality of packets, wherein the source timestamp comprises a TCP timestamp, and wherein extracting the first MTSP sequence and the second MTSP sequence is in response to the determining.

17. The non-transitory computer readable medium of claim 15, wherein comparing the first MTSP sequence and the second MTSP sequence comprises:

identifying a source timestamp proximity and a capture timestamp proximity between the first MTSP sequence and the second MTSP sequence, wherein the first flow and the second flow are determined, in response to identifying the source timestamp proximity and the capture timestamp proximity, to be generated by a single host of the network.

18. The non-transitory computer readable medium of claim 15, wherein comparing the first MTSP sequence and the second MTSP sequence comprises:

identifying a capture timestamp proximity between the first MTSP sequence and the second MTSP sequence; and identifying a source timestamp segregation between the first MTSP sequence and the second MTSP sequence, wherein the first flow and the second flow are determined, in response to identifying the capture timestamp overlap and the source timestamp segregation, to be generated by at least two hosts of the network.

19. The non-transitory computer readable medium of claim 15, wherein comparing the first MTSP sequence and the second MTSP sequence comprises:

identifying a capture timestamp segregation between the first MTSP sequence and the second MTSP sequence; and determining, based at least on the capture timestamp segregation, a predicted source timestamp range of the second MTSP sequence, wherein the result identifies a match between the predicted source timestamp range and the second MTSP sequence, and wherein the first flow and the second flow are determined, in response to identifying the match, to be generated by a single host of the network.

20. The non-transitory computer readable medium of claim 15, wherein comparing the first MTSP sequence and the second MTSP sequence comprises:

identifying a capture timestamp segregation between the first MTSP sequence and the second MTSP sequence; and determining, based at least on the capture timestamp segregation, a predicted source timestamp range of the second MTSP sequence, wherein the result identifies a mismatch between the predicted source timestamp range and the second MTSP sequence, and wherein the first flow and the second flow are determined, in response to identifying the mismatch, to be generated by at least two hosts of the network.

* * * * *